(12) United States Patent
Buerglin et al.

(10) Patent No.: US 8,671,663 B2
(45) Date of Patent: Mar. 18, 2014

(54) METHOD AND METERING SYSTEM FOR REDUCING POLLUTANTS IN MOTOR VEHICLE EXHAUST GASES

(75) Inventors: Markus Buerglin, Ditzingen (DE); Martin Czasch, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 760 days.

(21) Appl. No.: 12/280,040

(22) PCT Filed: Jan. 26, 2007

(86) PCT No.: PCT/EP2007/050774
§ 371 (c)(1),
(2), (4) Date: Aug. 20, 2008

(87) PCT Pub. No.: WO2007/107396
PCT Pub. Date: Sep. 27, 2007

(65) Prior Publication Data
US 2009/0025373 A1    Jan. 29, 2009

(30) Foreign Application Priority Data
Mar. 21, 2006    (DE) .......................... 10 2006 012 855

(51) Int. Cl.
*F01N 3/00*    (2006.01)
*F01N 3/10*    (2006.01)
*F01N 3/20*    (2006.01)

(52) U.S. Cl.
USPC ................... 60/286; 60/274; 60/295; 60/301; 60/303

(58) Field of Classification Search
USPC ............................ 60/274, 286, 295, 301, 303
See application file for complete search history.

(56) References Cited

U.S. PATENT DOCUMENTS 2,960,829 A * 11/1960 Ross ............................... 60/484
5,007,247 A * 4/1991 Danig .............................. 62/174
(Continued)

FOREIGN PATENT DOCUMENTS

DE    42 03 807 A1    8/1993
DE    103 24 482 A1    12/2004
(Continued)

*Primary Examiner* — Thomas Denion
*Assistant Examiner* — Brandon Lee
(74) *Attorney, Agent, or Firm* — Michael Best & Friedrich LLP

(57) ABSTRACT

A method of metering a fluid, pollutant-reducing medium, in particular an aqueous urea solution, into a motor vehicle exhaust system is proposed, in which the fluid medium is delivered to a nozzle module, in particular a nozzle or a valve, and introduced into the exhaust system by the nozzle module. A transport system arranged upstream of the nozzle module is activated with pulse-width modulation. The method and the associated metering system ensure that, in particular, a reducing agent is arranged or metered precisely and in a robust manner relative to degrees of coldness, with the use of few components.

17 Claims, 4 Drawing Sheets

(56) References Cited

U.S. PATENT DOCUMENTS

| | | | |
|---|---|---|---|
| 5,522,218 A * | 6/1996 | Lane et al. | 60/274 |
| 5,709,080 A * | 1/1998 | Arora et al. | 60/274 |
| 6,041,594 A * | 3/2000 | Brenner et al. | 60/309 |
| 6,203,770 B1 * | 3/2001 | Peter-Hoblyn et al. | 423/212 |
| 6,470,673 B1 * | 10/2002 | van Nieuwstadt et al. | 60/274 |
| 6,666,020 B2 * | 12/2003 | Tonetti et al. | 60/286 |
| 7,334,399 B2 * | 2/2008 | Carroll et al. | 60/286 |
| 2003/0033799 A1 * | 2/2003 | Scheying | 60/286 |
| 2003/0145580 A1 * | 8/2003 | Ripper et al. | 60/286 |
| 2004/0047783 A1 | 3/2004 | Huber et al. | |
| 2004/0083723 A1 * | 5/2004 | Hager et al. | 60/286 |
| 2004/0093856 A1 * | 5/2004 | Dingle et al. | 60/286 |
| 2004/0098978 A1 * | 5/2004 | Tarabulski et al. | 60/286 |
| 2006/0101811 A1 * | 5/2006 | Linna et al. | 60/286 |

FOREIGN PATENT DOCUMENTS

| | | |
|---|---|---|
| DE | 10 2004 050 022 A1 | 4/2006 |
| DE | 10 2004 054 238 A1 | 5/2006 |
| EP | 1 149 991 A2 | 10/2001 |
| WO | WO 02/24312 A1 | 3/2002 |
| WO | WO 2006/040086 A1 | 4/2006 |

\* cited by examiner

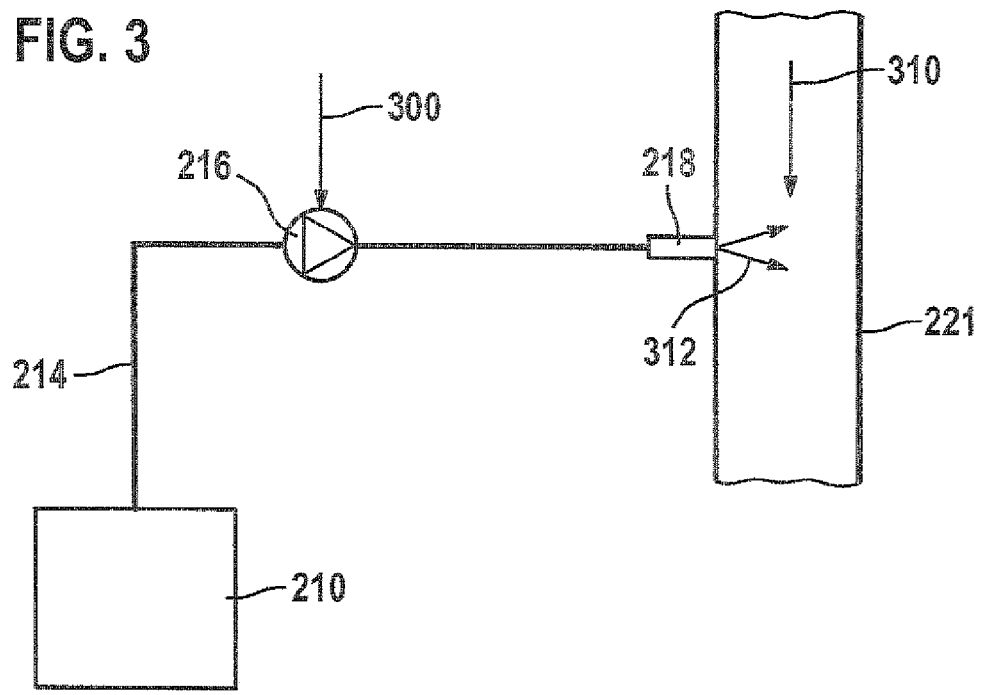
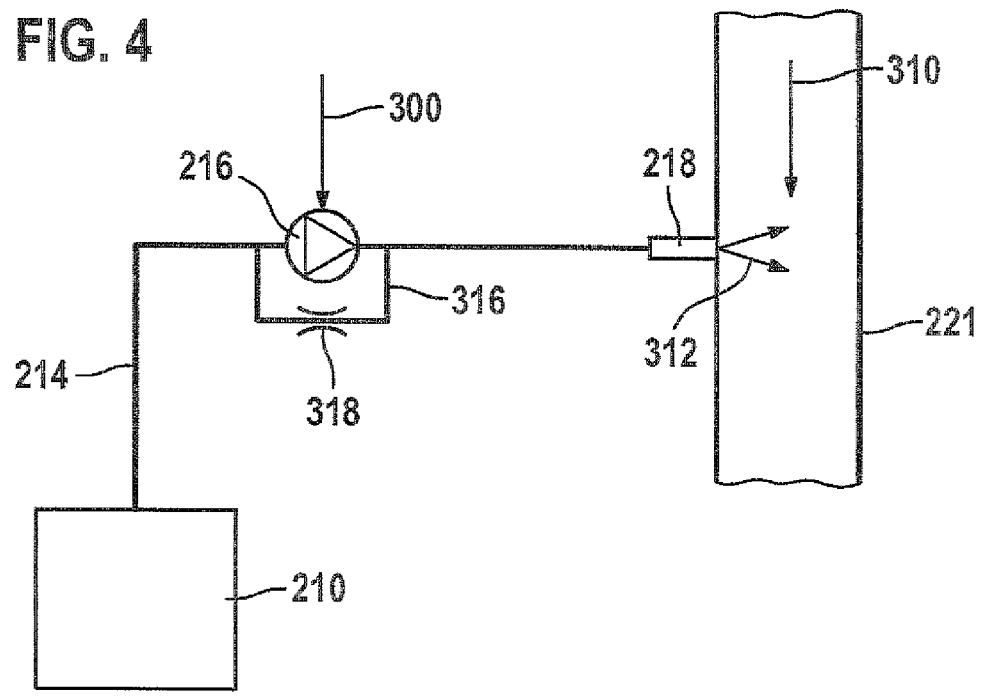

METHOD AND METERING SYSTEM FOR REDUCING POLLUTANTS IN MOTOR VEHICLE EXHAUST GASES

CROSS-REFERENCE TO RELATED APPLICATION

This application is a 35 USC 371 application of PCT/EP 2007/050774 filed Jan. 26, 2007.

BACKGROUND OF THE INVENTION

1. Field of the Invention

A proven method for reducing pollutants, in particular for reducing nitrogen oxides in the exhaust of lean-operated internal combustion engines, is the reduction of nitrogen oxides by means of a suitable chemical reducing agent. The known methods share the feature that fluid, (e.g. liquid or gaseous), pollutant-reducing media are sprayed into an exhaust system of an internal combustion engine where they react with the pollutants in the exhaust and chemically convert them. For this reason, a metering system for metering such fluid, pollutant-reducing media is proposed below, which system can be used for reducing pollutants in motor vehicle exhaust.

2. Prior Art Description of the Prior Art

In the so-called ammonia SCR method, particularly in the commercial vehicle sector, ammonia as a reducing agent is required in the exhaust upstream of a corresponding reducing agent catalyst. In current methods, the actual reducing agent ammonia is often released through thermolysis and subsequent catalyzing hydrolysis by air-injecting an aqueous urea/air aerosol into the engine exhaust through the use of compressed air.

With regard to a possible use in passenger vehicles, however, this method with compressed air injection is considered to be ill-adapted to market requirements due to its high system complexity (cost, space required, compressed air supply).

Another method for avoiding dependence on compressed air provides for the injection of a urea solution (AdBlue) into the engine exhaust. This is accomplished, for example, by means of pumps for pressurized delivery of the AdBlue.

This often involves the use of valves of the kind known from gasoline injection, which have various disadvantages. With these valves, difficulties arise for example due to the necessity for cooling the (usually electrical) valves, which are mounted directly onto the hot exhaust system. In addition, the winter operability of such systems is considered to be problematic. At temperatures below −11° C., the conventional urea/water solution freezes and expands. Consequently, achieving a winter operability of such valves and of other involved system components (pumps, pressure regulation, etc.) requires a considerable degree of engineering effort and expense, which also increase the system complexity (e.g. a construction that is able to withstand ice pressure, reverse-suction pumps, etc.).

DE 196 46 643 C1 has disclosed a system for injecting a nitrogen oxide reducing agent into an exhaust gas flow. In this case, the reducing agent is controllably injected into the exhaust gas flow in the form of fine jets delivered through a plurality of fine nozzle openings by means of local, cyclical generation of excess pressure. In this case, the nozzles are embodied in the form of piezoelectricaily controlled nozzles similar to the nozzles used in piezoelectric inkjet printing heads or nozzles with cyclically operated heating resistor elements that are similar to known bubble jet-type inkjet printing heads. The system described in DE 196 46 643 C1, however, has a complex apparatus, is prone to malfunction—particularly with regard to corrosive fluids, and is expensive.

DE 103 24 482 A1 has disclosed controlling a metering valve, which is supplied from the return of a reducing agent circuit, by setting a certain pulse-width ratio. The reducing agent circuit in this case can be regulated and switched on and off by means of a pressure regulating valve. The valve is mounted onto the exhaust pipe and it is necessary to install and use mechanically rugged, short circuit-protected electrical lines and plug connections between a control unit and the valve. The electrically switchable valve is also subjected to the heat of the exhaust pipe and can be cooled by means of a fluid circuit in the form of the reducing agent circuit.

ADVANTAGES AND SUMMARY OF THE INVENTION

The present invention proposes a metering system and a method for metering fluid, pollutant-reducing media—in particular aqueous urea solutions, which make advantageous use of at least one pulse-width controlled transport means. The metering should take place in a motor vehicle exhaust system that can, in particular, be equipped with a catalytic converter. Thanks to the presence of an actuator in the form of a pulse-width modulation controlled transport means situated upstream of a nozzle module, the actuator is better protected from ambient influences such as extreme temperatures, impact, collision, and particulate matter. In addition, it is no longer necessary to provide external electrical lines leading to a valve; it is possible to simplify the hydraulic system (elimination of a cooling circuit), fewer components are required, and in particular, the functionality of a pump module and of a metering pump can be embodied in a space-saving, reasonably priced fashion.

The nozzle module can also be optimized for the production of the spray and the ambient conditions (heat resistance). All components can be embodied to be able to withstand ice pressure, making it unnecessary to empty the lines, particularly after terminating operation, and thus making it possible to assure winter operability.

The pulse-width modulated control of a pump module and metering pump turns out to be particularly advantageous, making it possible to combine the unctions of pressure production, fluid delivery, and quantity metering into one electrically controllable component while the mechanical function of the spray production can be optimized by means of a mechanical nozzle.

A pressure relief element in the form of a pressure relief aperture, for example in the form of a bore that has a definite diameter and is integrated into the pump, simply and inexpensively implements a method for metering, which can be used, for example, to reliably close an automatically opening nozzle quickly within a span of 10 milliseconds. This makes it possible to carry out more precise metering and in addition, the droplet size at the end of the metering process is smaller. This reduces the danger of an uneven distribution of AdBlue in the exhaust system and the danger of deposits.

BRIEF DESCRIPTION OF THE DRAWINGS

The invention will be described below in conjunction with the drawings in which:

FIG. 3 shows a second metering system, FIG. 4 shows a third metering system.

DESCRIPTION OF THE EXEMPLARY EMBODIMENTS

Figure 1:
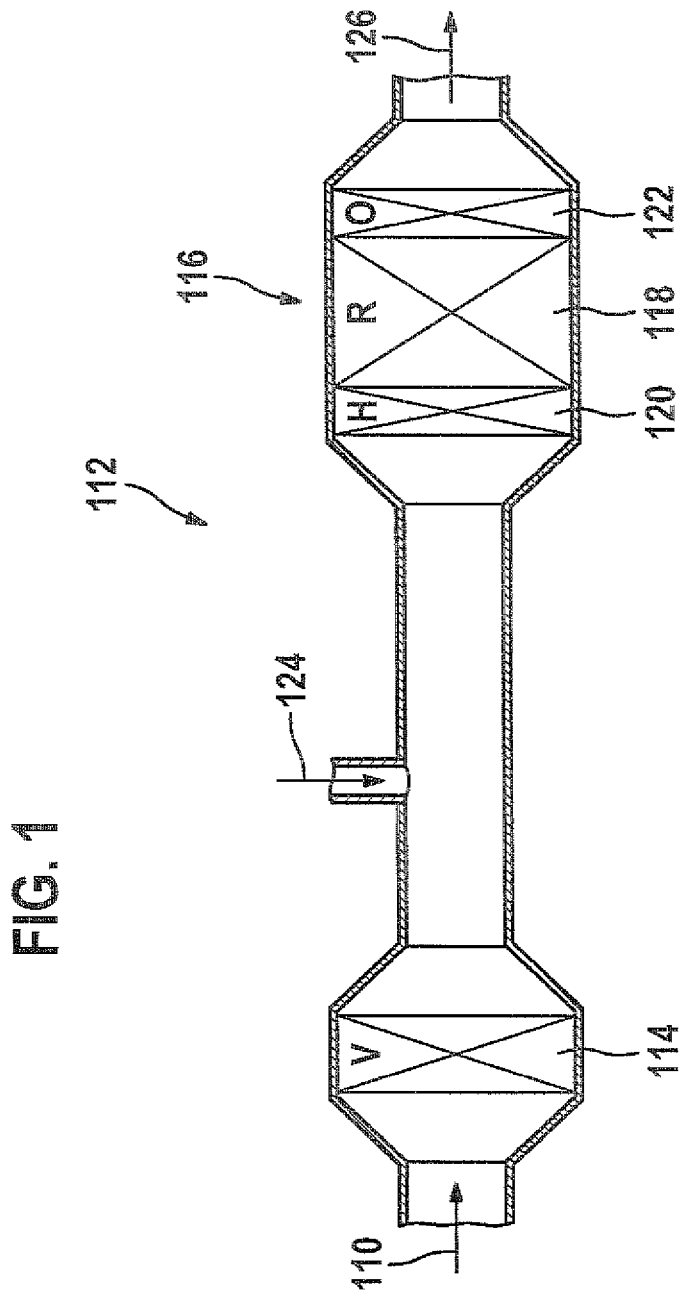
FIG. 1 shows an example of a system for selective catalytic reduction (SCR) in commercial vehicles.

FIG. 1 shows an example of a system for selective catalytic reduction (SCR) of the kind that is particularly of interest in the commercial vehicle sector.

In this system, exhaust gases 110 from an internal combustion engine are introduced into a two-stage catalytic converter 112. The two-stage catalytic converter 1.12 has a primary catalytic converter 114 and a main catalytic converter 116. The latter in turn has a reduction catalytic converter 118, a hydrolysis catalytic converter 120, and an oxidation catalytic converter 122. The reducing agent 124 is introduced into the exhaust system, for example in an air-supported fashion, upstream of the reduction catalytic converter 118. This aqueous aerosol reducing agent 124 is disintegrated through thermolysis and subsequent catalyzed hydrolysis and produces the actual reducing agent ammonia, which in turn reacts with the nitrogen oxides of the engine exhaust gases 110 and converts them into nitrogen oxide-reduced exhaust gases 126. The use of the SCR method, however, is not limited to the catalytic converter type shown in FIG. 1; it is also possible to use other designs of catalytic converters. Therefore the catalytic converters 114, 120, and 122, for example, are not absolutely required.

Figure 2:
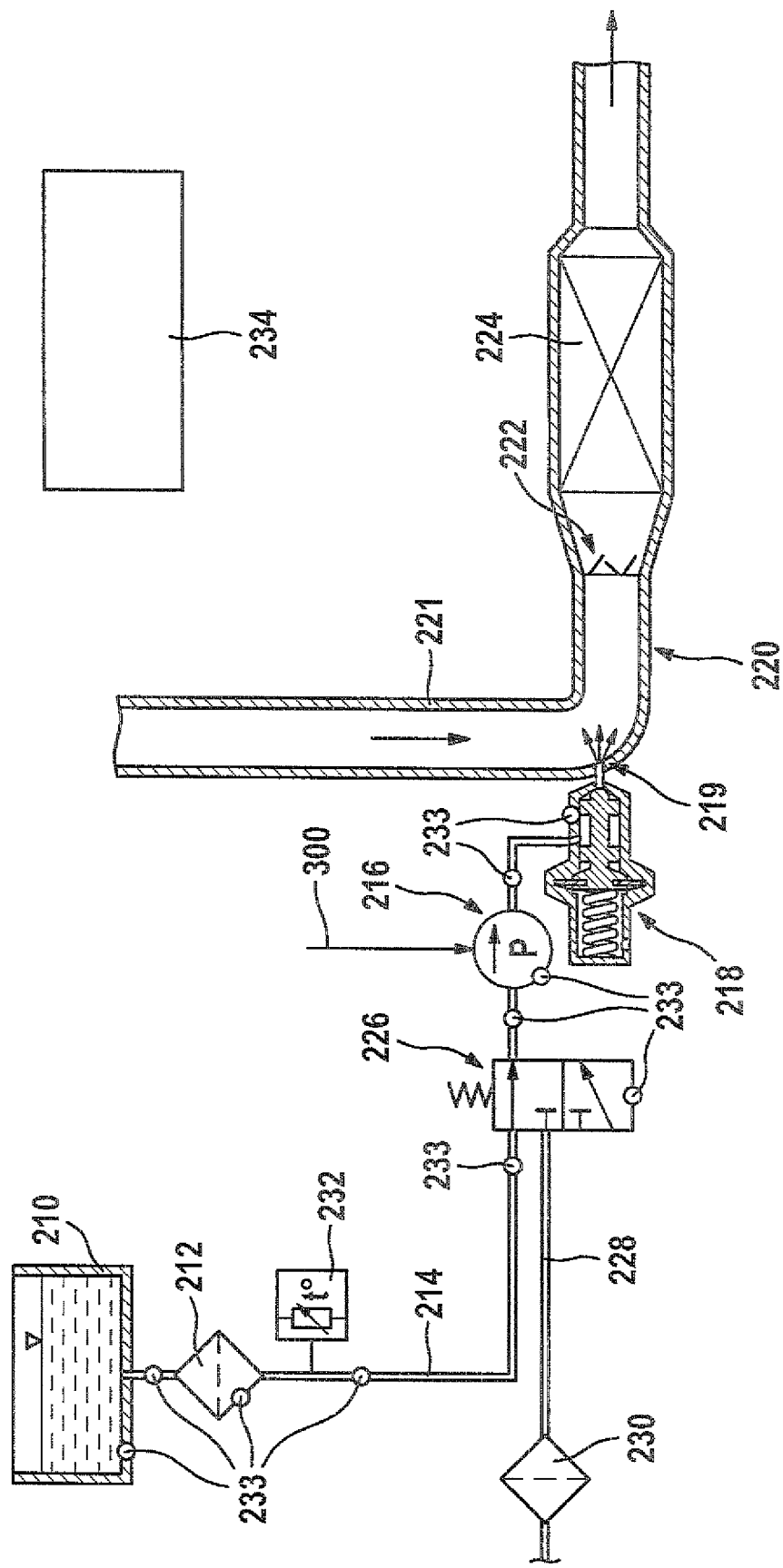
FIG. 2 shows a metering system with a pulse-width controlled metering pump and an automatically opening nozzle.

FIG. 2 shows a metering system for metering fluid, pollutant-reducing media by means of a metering pump 216 and a nozzle unit 218. In this example, a urea/water solution (AdBlue) is used, which is stored in a corresponding storage tank 210. The storage tank 210 is connected to a metering pump 216 via a fitter 212 and a conduit system 214. The filter 212 is particularly used to prevent particles from the storage tank 210 from traveling into the metering pump 216 and/or the nozzle unit 218.

An automatically opening nozzle unit 218 is integrated directly into the metering pump 216, which opens at a particular pressure and injects the required quantity of urea into an exhaust system 220 at the injection site 219. As shown in FIG. 2, in this exemplary embodiment, the exhaust system 220 includes an exhaust pipe 221, a static mixer 222, and a catalytic converter 224. The arrangement consequently has transport means (212, 214, 233, 226, 216) that are fluidically coupled between the storage tank 210 and the nozzle module or nozzle 218. The expression "automatically opening nozzle" is understood here to mean a nozzle that is closed whenever the pressure of the supplied fluid falls below a predetermined minimum pressure. But if the pressure in the fluid reaches or exceeds the minimum pressure, then the nozzle opens and meters the fluid into the exhaust system of the motor vehicle.

This injection is optimized in terms of spray pattern and droplet size so that it is optimally adapted to the injection site 219. Alternatively, there is also a conceivable variant with one or more cord-shaped jets in which the at least one cord-shaped jet in the exhaust system 220 is directed at a deflector plate or deflector (not shown in FIG. 2) and is thus spread out in a corresponding fashion.

Directly upstream of the metering pump 216, the conduit system 214 has a ventilation valve 226 installed in it via which it is possible to fill the metering pump 216 and the nozzle unit 218 with air via an air conduit system 228 and an air filter 230. This provides an effective protection against freezing damage to the metering system, particularly when switching off the engine at low ambient temperatures.

In addition, the conduit system 214, the ventilation valve 226, the metering pump 216, and the nozzle unit 218 are embodied as heatable. The temperature of the urea solution in the conduit system 214 is optionally monitored by one or more temperature sensors 232 that can be used, for example, for computer-correction of the mass flow rate and therefore to compensate for temperature-induced fluctuations in density. The temperature sensors 232 can be situated at various locations in the system. In addition, various heating elements 233 (depicted schematically in FIG. 2) can be selectively situated at various locations in the system—in particular at the storage tank 210, the filter 212, the ventilation valve 226, the metering pump 216, the metering valve 218, and at various locations between these components in the conduit system 214—and these heating elements can be used to regulate the temperature and to defrost the system at low ambient temperatures.

In addition, various pressure sensors, all or some of which can be electronically read out and monitored, are situated in the conduit system 214 and in the metering pump 216. It is thus possible, in particular, for a pressure sensor to be positioned between the metering pump 216 and the nozzle unit 218 and for its measurement data to contribute to the improvement of the mass flow rate calculation and to the monitoring of the system.

The metering system shown is constantly monitored and controlled by the control unit 234 during operation of the internal combustion engine. The control unit 234 can be a separate control unit or can be a component of an engine control unit (ECU) that is provided in a motor vehicle anyway. The control unit 234 thus constantly evaluates all of the pressure and temperature signals, controls the pump output of the metering pump 216, and controls the action of the ventilation valve 226. It is also possible for a heating system (not shown in FIG. 2) to be used and controlled by the engine control unit 234, for example in order to prevent the conduit system 214 from freezing at low operating temperatures.

The control unit 234 controls the metering pump in a pulse-width modulated fashion (pulse-width modulated control 300). This means that the electrically controlled pump is acted on with an operating current that either assumes a predetermined, constant value other than zero (the normal operating current dictated by the pump design) or assumes the value zero. In other words, a chronological modulation of the operating current occurs, where the operating current is either zero (i.e. the pump not operating) or assumes a fixed, predetermined non-zero value that is always the same when the pump is operating and corresponds to the normal operating current of the related pump. This means that in the case of a rotary piston pump, the speed of the pump is either zero or has a value that corresponds to the normal operating current of the pump. In each case, the automatically opening nozzle opens whenever the pump is acted on with the normal operating current, i.e. the control signal of the pump has the value "1". But if the control signal of the pump has the value "0", then the pump is not operating and the automatically opening nozzle correspondingly closes at least a short time after the pump is switched off. In accordance with a required quantity per unit time of pollutant-reducing medium, the control unit sets or regulates a predetermined pulse-width ratio of the pump control signal. The pulse-width ratio in this case is the ratio of the duration of time during which the pump is switched on (control signal with the value "1") to the duration of time during which the pump is switched off (control signal with the value "0"). In this context within an operating phase, there can be times in which the pollutant-reducing medium is continuously injected and there can be times in which the injection into the exhaust system occurs only intermittently or cyclically—due to reduced demand—during an operating phase of the internal combustion engine.

The metering system shown in FIG. 2 has a number of decisive advantages in comparison to conventional systems. The metering system is inexpensive to produce since it is possible, for example, to use the more reasonably priced components of a metering pump 216 and an automatically opening valve unit 218 in lieu of a diaphragm pump and a metering valve. It is also possible to manufacture the above-described metering system in a smaller size. In particular, this also enables its use in passenger vehicles. Up to now, however, most conventional systems have been limited to use in commercial vehicles. Moreover, a compressed air supply is not required, which further reduces the size of the system. The metering system described here is also significantly less prone to malfunction than conventional systems, particularly at low temperatures. This is assured in particular through the possibility of ventilation by means of the ventilation valve 226 and the possibility of heating the metering system. The ventilation valve can be used to supply air into the at least one pump and/or the at least one automatically opening nozzle when the engine of the motor vehicle is switched off. The small amounts of remaining fluid in the pump and/or the nozzle here can be emptied, for example into the exhaust system. In this context, the expected quantity can be viewed as noncritical and can, for example, be detected by the control unit, temporarily stored, and included in another calculation of the quantity of fluid to be metered when the engine of the motor vehicle is restarted. In this case, the at least one metering pump should in particular be designed so that it is also able to produce a pressure in the direction toward the automatically opening nozzle, even with air or a protective gas as the medium.

FIG. 3 shows an embodiment of the metering system that is simplified in comparison to the system shown in FIG. 2. Components that are the same or similar to those in the apparatus in FIG. 2 have been provided with the same reference numerals and are not described in further detail here. Here, too, an aqueous urea solution ("AdBlue"), for example, is drawn from a storage tank 210; the transport means (214, 216) situated between the tank and the nozzle 218 include a metering pump 216, for example a diaphragm pump, that is controlled in a pulse-width modulated fashion (300). The nozzle 218, which automatically opens in the presence of fluid pressure and is connected to the pump via the line 214, is mounted onto the exhaust pipe 221 and injects the fluid, pollutant-reducing medium (AdBlue) into the exhaust gas flow 310 (fluid jet 312). In comparison to the apparatus shown in FIG. 2, a ventilation device has been eliminated here. In the course of the pulse-width modulated control, for the time phases during which the pump is activated, the control unit calculates the duration of the power supply to the pump by means of a characteristic curve that expresses the functional relationship between the injection duration and the duration of the power supply to the pump.

FIG. 4 shows a metering system, which, in a modification of the apparatus according to FIG. 3, has a pressure relief element in the form of a bypass path. The bypass path is comprised of a bypass line 316 that connects the outlet of the pump 216 to its inlet; the bypass line 316 contains a throttle restriction in the form of a pressure relief aperture 318, e.g. in the form of a throttle embodied as a constriction in the line 316.

In the embodiment according to FIG. 4, in addition to the line 214 and the pump 216, the transport means also include a bypass line 316 and a pressure relief aperture 318. With the pressure relief aperture between the pressure side and suction side of the pump, after an injection, a more rapid pressure decrease is achieved in the metering line between the pump or pump module (pump with integrated pressure relief aperture) and the exhaust system because small quantities of AdBlue can flow through the aperture into the intake line, i.e. the line between the storage tank and the pump. As a result, the nozzle closes more rapidly and the droplet size at the end of the metering process is smaller. This reduces the danger of an uneven distribution of AdBlue in the exhaust system and the danger of deposits. This aperture can be embodied in the form of a bore with a definite diameter and can, for example, be integrated into the pump ("pump module").

Figure 5:
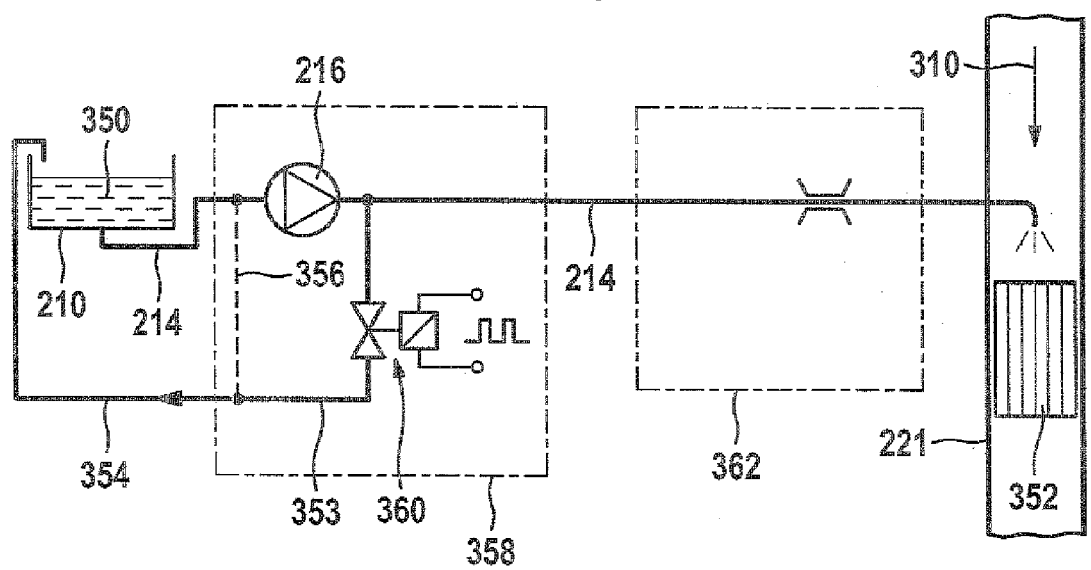
FIG. 5 shows a fourth metering system.

FIG. 5 shows a metering system in which a urea/water solution 350 is drawn from a tank 210 by means of the pump 216 and, via the conduit system 214 and a nozzle module 362 attached to it, is injected into the exhaust system upstream of the SCR catalytic converter 352. The nozzle module is embodied in the form of a constriction in the conduit system 214 and is situated upstream of a spray tube that extends into the exhaust pipe 221 upstream of the SCR catalytic converter. In addition to the pump 216, the pump module 358 in the current exemplary embodiment also has an electrically switchable so-called relief valve 360, which, via a return line 353, connects the outlet of the pump 216 to a tank return line 354 that leads to the storage tank and feeds into the storage tank above the fluid level. Alternatively or in addition to the tank return line 354, the return line 353 can also be connected to a return line 356 leading to the pump inlet. Consequently, in addition to the line 214, the transport means 214, 358 here also include a pump module 358 equipped with a metering pump 216 and a relief valve 360.

As in the preceding exemplary embodiments, the mass flow rate of the pollutant-reducing medium is controlled or regulated in a pulse-width modulated fashion by means of the pressure difference at the nozzle module instead of by means of a cross-sectional change at an actuator as in the systems known from the prior art. Since ideally, the pressure in a hydraulic system is the same everywhere, the location of the pressure variation is independent of the location of the metering. In other words, the pressure variation can occur at any location within the hydraulic system, for example even in the pump module, as is the case here. In this case, the pump of the pump module can be controlled in a pulse-width modulated fashion; alternatively or in combination with this, the relief valve can be controlled in a pulse-width modulated fashion. When the relief valve is open and the pump is running, the medium is returned to the tank and alternatively or in combination with this, is returned to the inlet side of the pump so that in this manner, the pump can run continuously and a modulation of the metering can take place through the triggering of the relief valve. It is thus possible for a pulsating triggering of the pump to occur and then pressure is only produced when metering is to take place. Alternatively or in combination with this, during operation and therefore during pressure production, it is possible for the relief valve to execute a pulsating pressure relief of the line 214 between the pump and the nozzle module, thus making it possible to correspondingly interrupt or restart the metering. The pump module (in this case, the pump, relief valve, and some of the lines) is either composed of separate components that are functionally and conceptually combined to form a "pump module" or else the relief valve and pump comprise a unit that is not only conceptual, but also structural, in particular an integrally joined unit. The metering and production of a spray occurs by means of the nozzle module 362, which because of the functional separation of the triggering, can be designed so that it is optimized in terms of spray production and is also heat resistant, for example embodied in the form of a nozzle that is attached to the exhaust system by means of a mount, i.e. has no electrical and/or moving components.

Alternatively to the combination of a pipe constriction/spray tube, it is also possible for the nozzle module here to have an automatically opening nozzle that is situated downstream of a spray tube, is mounted directly onto the exhaust system, or protrudes into it.

In all the exemplary embodiments, in addition to meaning a simple diaphragm pump, the term "metering pump" is also understood to mean pump for supplying a fluid, it being possible to adjust the supplied volumetric flow rate with a predetermined degree of precision. The term can also be understood, however, to mean a pump that transports a certain volume, in which case it should be possible, with a predetermined degree of precision, to adjust the volume that is to be transported. A metering pump can also be understood to be a pump in which the fluid is supplied with a predetermined pressure, it being possible to adjust the pressure, for example, with a predetermined degree of precision. The purpose of the metering pump is to transport, when activated, the at least one fluid, pollutant-reducing medium at the predetermined pressure and/or at a predetermined volumetric flow rate. It is possible to use any pump whose mass inertia is low enough to permit it to be set into motion quickly enough and brought back to a stop quickly enough. This makes it possible to also meter small quantities with a sufficient degree of precision.

Figure 6:
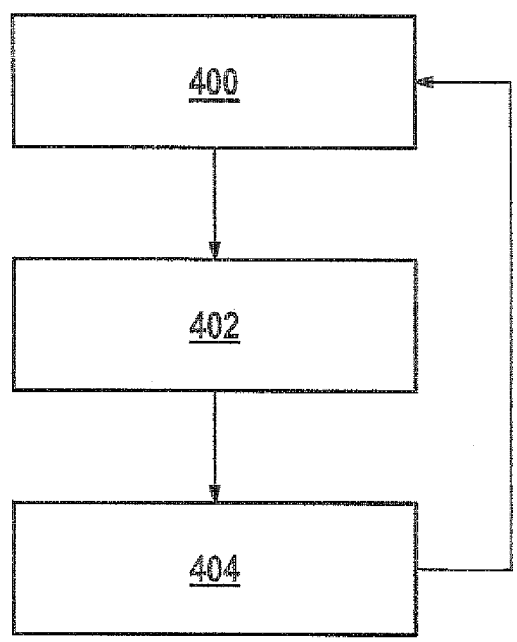
FIG. 6 shows a flowchart for the method of pulse-width modulated metering.

FIG. 6 shows a flow chart of the method according to the invention. The first step 400 is a detection of the operating parameters such as the speed the engine, engine load, and residual content of pollutants downstream of the exhaust treatment unit. In another step 402, the required quantity of pollutant-reducing medium is calculated, in particular the requirement per unit time. In another step 404, a demand-dependent pulse-width modulated control of a transport means is carried out, for example a pump module, in particular a pump or a pressure relief valve. The steps 400, 402, and 404 are carried out repeatedly as long as the internal combustion engine is running.

The foregoing relates to the preferred exemplary embodiments of the invention, it being understood that other variants and embodiments thereof are possible within the spirit and scope of the invention, the latter being defined by the appended claims.

Reference Numeral List
110 exhaust gases from internal combustion engine
112 two-stage catalytic converter
114 primary catalytic converter
116 main catalytic converter
118 reduction catalytic converter
120 hydrolysis catalytic converter
122 oxidation catalytic converter
124 urea/air aerosol
126 nitrogen-reduced exhaust gases
210 storage tank
212 filter
214 conduit system
216 metering pump
218 integrated, automatically opening nozzle unit
219 injection site
220 exhaust system
221 exhaust pipe
222 static mixer
224 catalytic converter
226 ventilation valve
228 air conduit system
230 air filter
232 temperature sensor
233 heating element
234 control unit
300 pulse-width modulated control
310 exhaust gas flow
312 jet
316 bypass line
318 pressure relief aperture
350 urea/water solution (AdBlue)
352 SCR catalytic converter
353 return line
354 tank return line
356 return line to pump inlet (alternatively or in addition to 354)
358 pump module
360 relief valve
362 nozzle module
400 detection of operating parameters
402 calculation of demand
404 pulse-width modulated control

The invention claimed is:

1. A method for metering a fluid, pollutant-reducing medium into a motor vehicle exhaust system, comprising the steps of:
supplying the fluid medium to a nozzle;
introducing the fluid medium into the motor vehicle exhaust system through the nozzle;
controlling at least one of a pump and a pressure relief element with pulse-width modulation;
positioning the pump upstream of the nozzle;
connecting an outlet of the pump to at least one of an inlet of the pump and a return line leading to a reservoir with a bypass path;
positioning the pressure relief element in the bypass path;
pumping fluid medium into the nozzle and increasing a pressure in the nozzle;
opening the nozzle in response to the increase in pressure;
injecting the fluid medium through the nozzle into the motor vehicle exhaust system at an injection site;
positioning the nozzle adjacent the injection site;
propelling the fluid medium through the nozzle and into the motor vehicle exhaust system with the pump in response to the increase in pressure in the nozzle; and
at least in periods of time in which the pump is not in operation, flowing the fluid medium at least partially back via the bypass path from an outlet side of the pump to its inlet side or to the reservoir so that the nozzle closes in response to a drop in pressure in the nozzle.

2. The method as recited in claim 1, wherein the pressure relief element is a pressure relief aperture or throttle.

3. The method as recited in claim 1, wherein the pressure relief element is a relief valve.

4. The method as recited in claim 3, wherein the relief valve is electrically switchable.

5. The method as recited in claim 4, wherein the step of controlling at least one of a pump and a pressure relief element with pulse-width modulation includes a pulse-with modulation of a switching current of the relief valve.

6. The method as recited in claim 5, wherein further comprising varying the output of the fluid medium by means of a variable pulse-width ratio in a pulse-width modulation of an operating current and/or the pulse-width modulation of the switching current.

7. The method as recited in claim 1, wherein the step of controlling at least one of a pump and a pressure relief element with pulse-width modulation occurs electrically and includes a chronological modulation of an operating current of the pump between a value of zero and a predetermined value other than zero.

8. The method as recited in claim 1, further comprising the step of detecting at least one of the following operating parameters: speed of the motor vehicle engine, its load, temperature of the fluid medium, pressure of the fluid medium in a connecting line between the pump module and the exhaust system, and residual concentration of nitrogen oxides after nitrogen oxides reduction is carried out.

9. The method as recited in claim 1, further comprising calculating a requirement for pollutant-reducing medium per unit time, as a function of measured values for detected operating parameter or parameters.

10. The method as recited in claim 1, further comprising regulating the pulse-width modulation of the at least one of the pump and the pressure relief element as a function of the requirement for the fluid, pollutant-reducing medium.

11. The method as recited in claim 1, further comprising drawing the fluid medium from at least one reservoir that serves as a storage tank with the pump, supplying the fluid medium to the nozzle, increasing the pressure in the nozzle, opening the nozzle in response to the increased pressure, injecting the fluid medium into the injection site of the motor vehicle exhaust system.

12. The method as recited in claim 1, wherein the fluid medium is an aqueous urea solution.

13. A metering system for metering a fluid, pollutant-reducing medium into a motor vehicle exhaust system, the metering system comprising:
   a nozzle positioned adjacent an injection site to introduce the fluid medium into the motor vehicle exhaust system at the injection site;
   a pump supplying the fluid medium to the nozzle;
   an electronic control unit operable to activate and deactivate the pump; and
   a bypass path fluidly connecting an outlet of the pump to at least one of an inlet of the pump and a return line leading to a reservoir;
   a pressure relief element positioned in the bypass path;
   wherein at least one of the pump and the pressure relief element is triggered by pulse-width modulation,
   wherein, when the electronic control unit activates the pump, a pressure in the nozzle increases which opens the nozzle module, to thereby inject the fluid medium into the motor vehicle exhaust system,
   wherein, when the electronic control unit deactivates the pump, the fluid medium flows at least partially back via the bypass path from an outlet side of the pump to its inlet side or to the reservoir so that the nozzle closes in response to a drop in pressure in the nozzle, and
   wherein the fluid medium is propelled by the pump through the nozzle module and into the motor vehicle exhaust system.

14. The metering system as recited in claim 13, wherein the pressure relief element is a pressure relief aperture or throttle.

15. The metering system as recited in claim 13, wherein the pressure relief element is a relief valve.

16. The metering system as recited in claim 13, wherein the fluid medium is an aqueous urea solution.

17. A computer program comprising:
   a non-transitory computer-readable medium; and
   an executable programming code residing on the computer readable medium, which when executed, performs the steps of the method as recited in claim 1.

\* \* \* \* \*

UNITED STATES PATENT AND TRADEMARK OFFICE
CERTIFICATE OF CORRECTION

PATENT NO. : 8,671,663 B2
APPLICATION NO. : 12/280040
DATED : March 18, 2014
INVENTOR(S) : Buerglin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this
Twenty-ninth Day of September, 2015

Michelle K. Lee
*Director of the United States Patent and Trademark Office*